(12) United States Patent
Kopecek et al.

(10) Patent No.: US 8,047,166 B2
(45) Date of Patent: Nov. 1, 2011

(54) ELECTRIC VALVE ACTUATION SYSTEM

(75) Inventors: Herbert Kopecek, Hallbergmoos (DE); Michal-Wolfgang Waszak, Nandlstadt (BY)

(73) Assignee: General Electric Company, Niskayuna, NY (US)

( * ) Notice: Subject to any disclaimer, the term of this patent is extended or adjusted under 35 U.S.C. 154(b) by 585 days.

(21) Appl. No.: 12/060,899

(22) Filed: Apr. 2, 2008

(65) Prior Publication Data
US 2009/0250644 A1    Oct. 8, 2009

(51) Int. Cl.
*F01L 9/04* (2006.01)
(52) U.S. Cl. ............... 123/90.11; 92/71; 251/129.01; 417/269
(58) Field of Classification Search ............ 123/90.11; 251/129.01, 129.02, 129.15; 92/71; 417/269; 418/22
See application file for complete search history.

(56) References Cited

U.S. PATENT DOCUMENTS

| | | | |
|---|---|---|---|
| 2,160,860 A | 6/1939 | Gustafson | |
| 2,595,369 A | 5/1952 | Repscha et al. | |
| 2,667,299 A | 1/1954 | Gustafson | |
| 5,005,539 A * | 4/1991 | Kawamura | 123/21 |
| 5,072,700 A | 12/1991 | Kawamura | |
| 5,115,772 A | 5/1992 | Kawamura | |
| 6,544,004 B2 * | 4/2003 | Fujii et al. | 417/222.2 |
| 6,705,102 B2 * | 3/2004 | Adaniya et al. | 62/228.1 |
| 2007/0186692 A1 | 8/2007 | Waszak et al. | |

FOREIGN PATENT DOCUMENTS

| | | |
|---|---|---|
| EP | 0397521 A1 | 11/1990 |
| EP | 1170469 A1 | 1/2002 |
| FR | 2833650 A1 | 6/2003 |
| WO | 03064820 A2 | 8/2003 |

OTHER PUBLICATIONS

IT C020090028 Search Report and Written Opinion, Apr. 14, 2010.
FR2833650 Search Report, Jun. 20, 2003.

\* cited by examiner

*Primary Examiner* — Ching Chang
(74) *Attorney, Agent, or Firm* — Jason K. Klindtworth (57) ABSTRACT

A machine includes a piston disposed in a housing and configured to reciprocate in the housing. At least one valve is coupled to the housing. A magnetically-geared valve actuation system is coupled to the at least one valve. A plurality of sensors is configured to detect a plurality of parameters related to the machine. A control system is coupled to the plurality of sensors and the magnetically-geared valve actuation system. The magnetically-geared valve actuation system is configured to actuate the at least one valve in response to reciprocation of the piston in the housing, signals originating from the sensors or control system, or combinations thereof.

22 Claims, 10 Drawing Sheets

ELECTRIC VALVE ACTUATION SYSTEM

BACKGROUND

The invention relates generally to an electric valve actuation system.

Piston machines such as internal combustion engines, piston compressors, and expanders normally use valves for establishing proper gas exchange processes in the machine. The valves are typically driven directly or indirectly by cams provided on a camshaft. In piston compressors, these valves may be driven by pneumatic or hydraulic means, or the valves may open and close without actuators due to the differential pressure acting on the valves. In engines the cams open (lift) the valves for a certain amount of time (duration) during each intake and exhaust cycle. The camshaft is driven by a crankshaft through timing belts, gears, or chains, for example.

At higher engine speeds, an engine requires more air. If the intake valves close before the required amount of air flows into the cylinder, engine performance is reduced. If the cam keeps the valves open for longer periods of time, unburnt fuel will exit the engine and result in lower engine performance and increased emissions.

For piston machines such as engines and compressors, variable valve timing (VVT) has high potential to reduce emissions (for engines) and increase efficiency (for compressors and engines). Changing the opening and closing time of the valves of an engine in a dynamic way (cycle by cycle), the combustion process can be better controlled for different operation set points which leads to better overall engine performance (higher efficiency and less emissions). Active control of valve timing of piston compressor valves avoids flow-bypass arrangements and thus enables high efficient part load operation. Additionally, it enables the use of adapted valve shapes, which increases overall efficiency of the compressor due to reduced valve losses. High dynamic changes in gas delivery can be also achieved with this technology. It is advantageous that with such an actuation system, gas exchange in each cylinder can be individually controlled. The method can be used to turn on and off each cylinder individually leading to a more flexible machine, which delivers power (in case of an engine) or compressed gas (in case of a compressor) on demand at lower energy losses. In one example, mechanical actuation systems are used to actuate valves of the piston machine. However, a mechanical actuation system provides only limited variability in terms of valve timing. In another example, hydraulic systems are used to actuate valves of the piston machine. However hydraulic systems suffer from a large and costly infrastructure for the fluid and from limited reliability.

Accordingly, there is a need for a compact system that facilitates greater flexibility in valve timing.

BRIEF DESCRIPTION

In accordance with one exemplary embodiment of the present invention, a machine includes a piston disposed in a housing and configured to reciprocate in the housing. At least one valve is coupled to the housing. A magnetically-geared valve actuation system is coupled to the at least one valve. A plurality of sensors is configured to detect a plurality of parameters related to the machine. A control system is coupled to the plurality of sensors and the magnetically-geared valve actuation system. The magnetically-geared valve actuation system is configured to actuate the at least one valve in response to reciprocation of the piston in the housing, signals originating from the sensors or control system, or combinations thereof.

In accordance with another exemplary embodiment of the present invention, an engine includes a piston disposed in a cylinder and configured to reciprocate in the cylinder. At least one air intake valve and at least one exhaust valve are coupled to the cylinder. A magnetically-geared valve actuation system is coupled to the at least one air intake valve, the at least one exhaust valve, or combinations thereof. A plurality of sensors is configured to detect a plurality of parameters related to the engine. A control system is coupled to the plurality of sensors and the magnetically-geared valve actuation system. The magnetically-geared valve actuation system is configured to actuate the at least one air intake valve, the at least one exhaust valve, or combinations thereof in response to reciprocation of the piston in the cylinder, signals originating from the sensors or control system, or combinations thereof.

In accordance with another exemplary embodiment of the present invention, a compressor includes a piston disposed in a housing and configured to reciprocate in the housing. At least one suction valve and at least one discharge valve are coupled to the housing. A magnetically-geared valve actuation system is coupled to the at least one suction valve, the at least one discharge valve, or combinations thereof. A plurality of sensors is configured to detect a plurality of parameters related to the compressor. A control system is coupled to the plurality of sensors and the magnetically-geared valve actuation system. The magnetically-geared valve actuation system is configured to actuate the at least one suction and discharge valves in response to reciprocation of the piston in the housing, signals originating from the sensors or control system, or combinations thereof.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention provide a machine such as a piston machine having a piston disposed in a housing. As used herein, singular forms such as "a," "an," and "the" include plural referents unless the context clearly dictates otherwise. At least one valve is coupled to the housing. A plurality of sensors is configured to detect a plurality of parameters related to the machine. The exemplary machine includes a magnetically-geared valve actuation system coupled to the at least one valve. A control system is coupled to the plurality of sensors and the magnetically geared valve actuation system. The magnetically-geared valve actuation system is configured to actuate at least one valve in response to reciprocation of piston in the housing, signals originating from the sensors or control system, or combinations thereof. In accordance with another exemplary embodiment of the present invention, an engine having a magnetically-geared valve actuation system configured to actuate at least one air intake valve, at least one exhaust valve, or combinations thereof is disclosed. In accordance with yet another exemplary embodiment of the present invention, a compressor having a magnetically-geared valve actuation system configured to actuate at least one suction valve, at least one discharge valve, or combinations thereof is disclosed. The exemplary magnetic gearing system is compact and provides a higher force density compared to conventional linear drive systems. The magnetic gearing system is able to provide a pre-defined actuation force over the entire stroke of the piston. The magnetic gearing system facilitates full flexible control of the valves of the exemplary machine, resulting in more flexible operation, improved transient behavior, reduced valve losses, and increased machine efficiency.

Figure 1:
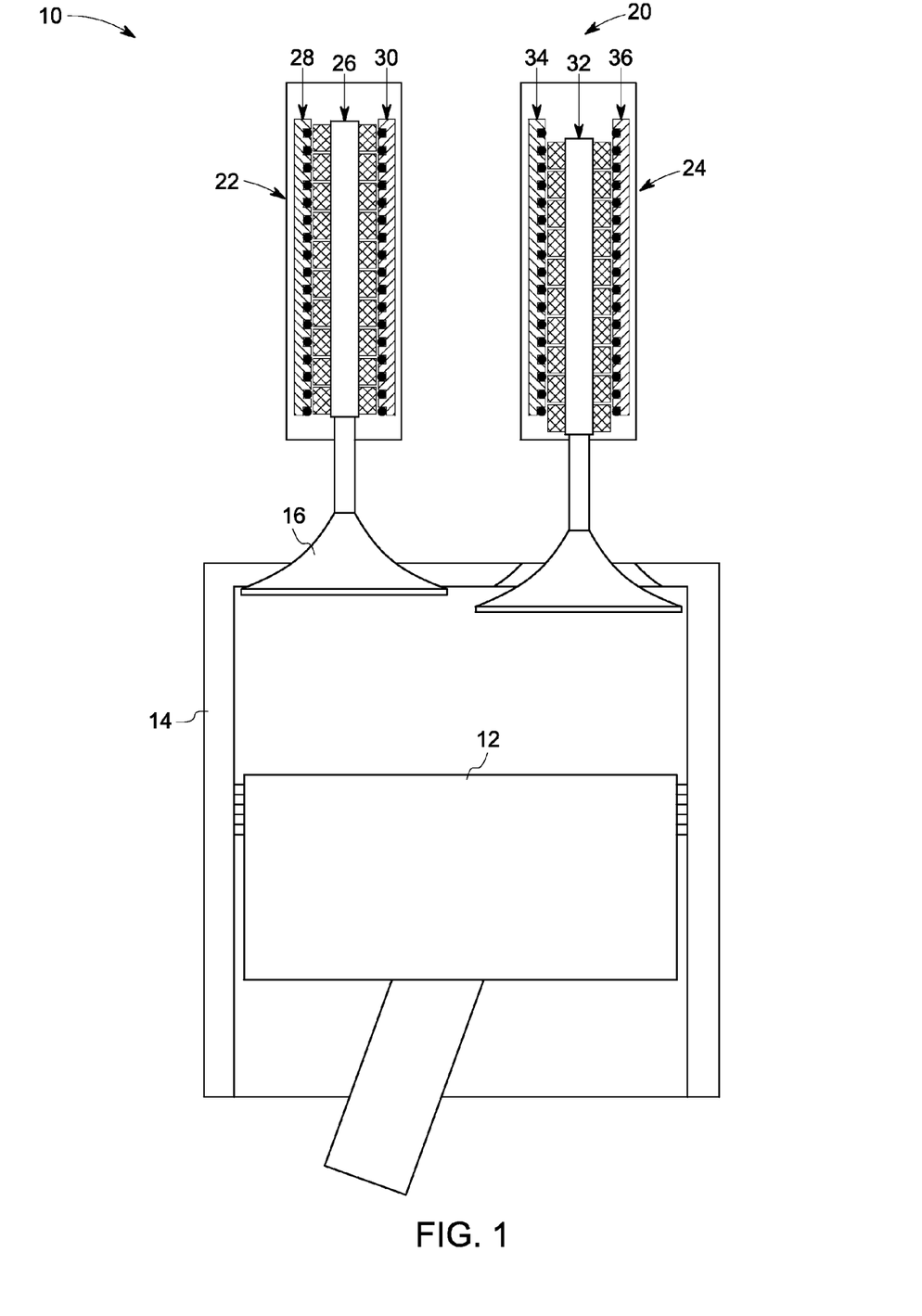
FIG. 1 is a diagrammatical view of an electric type magnetically-geared system configured to actuate an intake valve and exhaust valve of a machine in accordance with an exemplary embodiment of the present invention.

Referring to FIG. 1, a machine 10 in accordance with an exemplary embodiment of the present invention is disclosed. In the illustrated embodiment, the machine 10 is an internal combustion engine, e.g. a diesel engine, or an Otto-type engine. Even though an internal combustion is illustrated, it should not be construed in any way as limiting the scope. In certain other embodiments, other piston machines such as piston compressors, expanders, or the like are also envisaged. The engine 10 includes a piston 12 slidably disposed in a cylinder (housing) 14 and reciprocates between a top dead center and a bottom dead center position. The illustrated engine 10 includes an air intake valve 16 and an exhaust valve 18 coupled to the cylinder 14. Compressed air is cooled and supplied to the cylinder 14 through the air intake valve 16 for combustion within the engine 10. The exhaust gas resulting from combustion is removed from the cylinder 14 via the exhaust valve 18.

It is known that variable valve timing has high potential to reduce emissions. Flexible control of intake and exhaust valves through variable valve timing enables reduction in valve losses and thus increases machine efficiency. In the illustrated embodiment, the engine 10 includes a magnetically-geared valve actuation system 20 configured to actuate the intake valve 16 and the exhaust valve 18.

Figure 2:
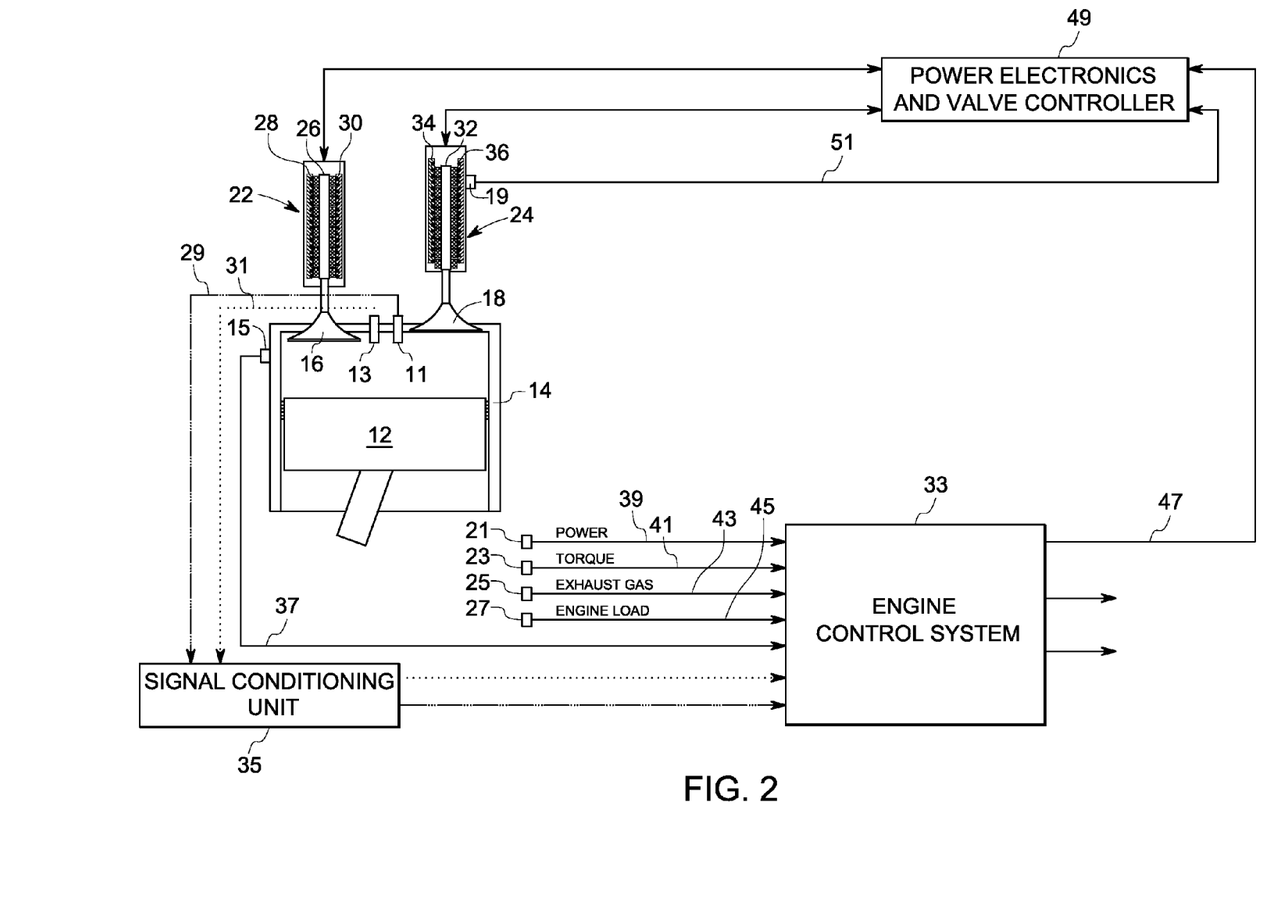
FIG. 2 is a diagrammatical view of an electric type magnetically-geared system configured to actuate an intake valve and an exhaust valve of a machine in accordance with the aspects of FIG. 1.

Referring now to FIG. 2, a plurality of sensors such as pressure sensor 11, optical sensor 13, knock sensor 15, valve position sensor 19, power sensor 21, torque sensor 23, gas sensor 25, and load sensor 27 are provided to detect a plurality of parameters of the engine 10. The pressure sensor 11 is configured to detect combustion pressure in the cylinder 14. The optical sensor 13 is configured to detect flame emission levels from the engine. The knock sensor 15 is configured to detect engine knock. The valve position sensor 19 is configured to detect a position of the respective valve. The power sensor 21 is configured to detect engine power. The torque sensor 23 is configured to detect engine torque. The gas sensor 25 is configured to detect exhaust gas emission levels from the engine. The load sensor 27 is configured to detect the engine load. In certain other embodiments, it should be noted herein the list of sensors may include other suitable sensors.

In the illustrated embodiment, output signals 29 and 31 from the pressure sensor 11 and the optical sensor 13 respectively are transmitted to an engine control system 33 via a signal conditioning unit 35. The knock sensor 15, power sensor 21, torque sensor 23, gas sensor 25, and engine load sensor 27 transmit output signals 37, 39, 41, 43, and 45 respectively to the engine control system 33. The engine control system 33 transmits an output signal 47 indicative of valve timing, piston stroke, or the like to a power electronics and valve controller 49. In the illustrated embodiment, the valve position sensor 19 transmits an output signal 51 to the controller 49. The engine control system 33 is configured to actuate the magnetically-geared valve actuation system 20 via the controller 49 in response to reciprocation of piston 12 in the cylinder 14, signals originating from the sensors mentioned above or the control system, or combinations thereof. It should be noted herein that the illustrated architecture is an exemplary embodiment and should not be construed as limiting. Any combination of engine parameters may be used to control the actuation of the valves 16, 18.

Referring now to both FIGS. 1 and 2, in one embodiment, the magnetically-geared valve actuation system 20 opens and closes the intake valve 16 and the exhaust valve 18 in response to reciprocation of piston 12 in the cylinder 14, signals originating from the sensors or control system described above, or combinations thereof. In the illustrated embodiment, the magnetically-geared valve actuation system 20 includes a first magnetically-geared actuator 22 coupled to the intake valve 16 and configured to open and close the intake valve 16. The first magnetically-geared actuator 22 includes a rotor 26 disposed between a first stator 28 and a second stator 30. The rotor 26 is coupled to the intake valve 16 and the stators 28, 30 are coupled to a cylinder head. The magnetically-geared valve actuation system 20 also includes a second magnetically-geared actuator 24 coupled to the exhaust valve 18 and configured to open and close the exhaust valve 18. The second magnetically-geared actuator 24 includes a rotor 32 disposed between a third stator 34 and a fourth stator 36. The rotor 32 is coupled to the exhaust valve 18 and the stators 34, 36 are coupled to the cylinder head. The working of the magnetically geared valve actuation system and various configurations are discussed in greater details with reference to subsequent figures.

It should be noted herein that the exemplary valve actuation system is applicable to machines having more than one intake and exhaust valves. In one embodiment, a plurality of magnetically-geared actuators may be used to actuate one intake valve. In another embodiment, one magnetically-geared valve actuator may be used to actuate a plurality of intake valves. In yet another embodiment, a plurality of magnetically-geared actuators may be used to actuate one exhaust valve. In another embodiment, one magnetically-geared valve actuator may be used to actuate a plurality of exhaust valves. All such permutations and combinations are envisaged.

The magnetically-geared valve actuation system can potentially offer significant benefits with respect to mechanical counterparts, primarily as a result of the lack of physical contact between an input shaft and an output shaft, hence reducing friction losses. As discussed previously, the magnetically-geared valve actuation system facilitates full flexible control of the valves of the exemplary machine, resulting in improved operability, transient behavior, reduced valve losses and increased machine efficiency. The exemplary system for controlling combustion processes may more rapidly facilitate introduction of combustion concepts such as HCCI (Homogeneously Charged Compression Ignition) or other combustion concepts based on high exhaust gas recirculation rates, which further reduce emissions and fuel consumption.

Figure 3:
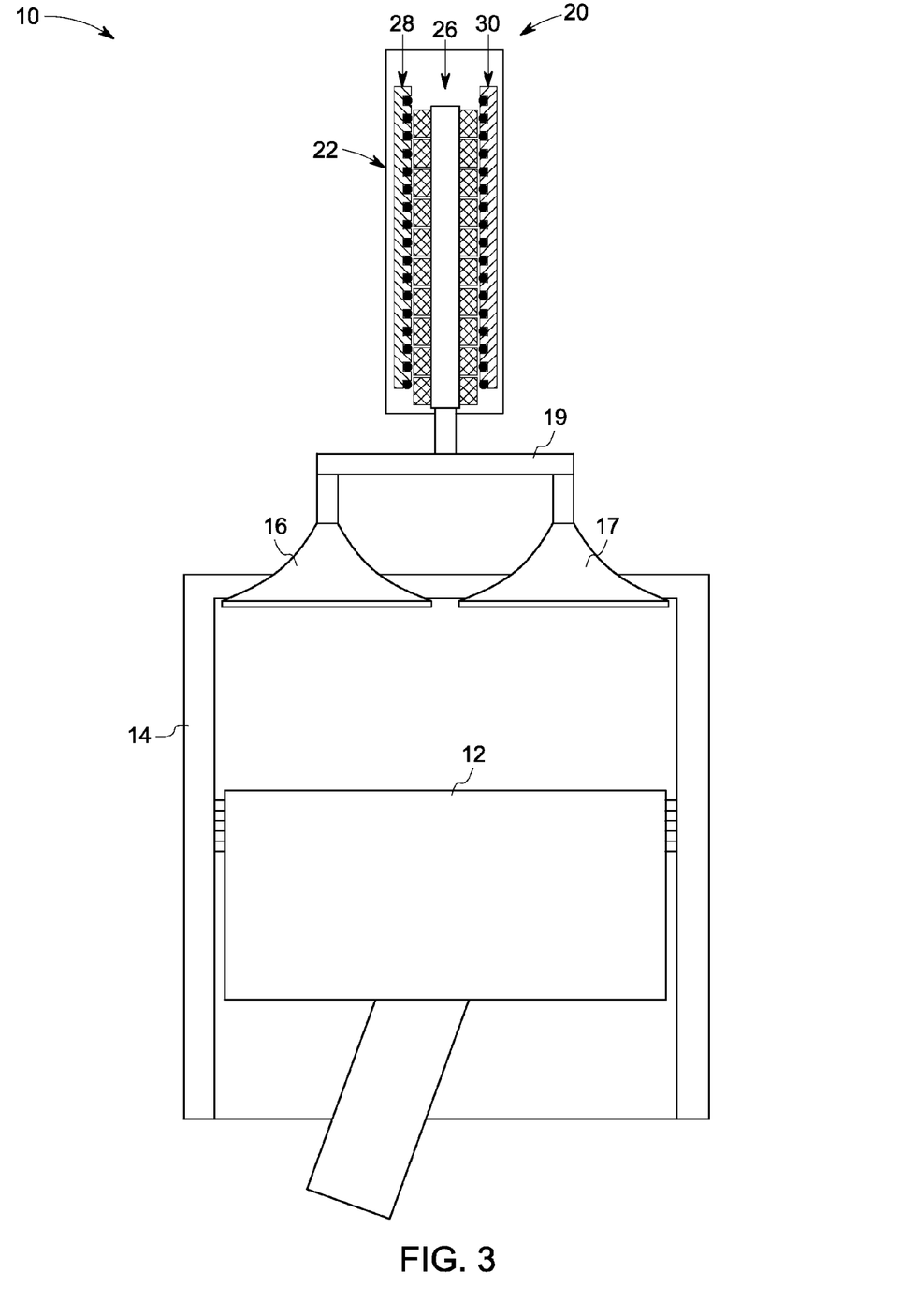
FIG. 3 is a diagrammatical view of a magnetically-geared valve actuation system having a magnetically-geared actuator configured to actuate one or more air intake valves of an internal combustion engine in accordance with another exemplary embodiment of the present invention.

Referring to FIG. 3, a magnetically-geared valve actuation system having a magnetically-geared actuator configured to actuate one or more air intake valves of an internal combustion engine in accordance with another exemplary embodiment of the present invention is disclosed. The illustrated engine 10 includes one air intake valve 16 and another air intake valve 17 coupled to the cylinder 14. Compressed air is cooled and supplied to the cylinder 14 through the air intake valves 16, 17 for combustion within the engine 10.

In the illustrated embodiment, the engine 10 includes the magnetically-geared valve actuation system 20 configured to actuate the intake valves 16, 17. In one embodiment, the magnetically-geared valve actuation system 20 opens and closes the intake valves 16, 17 in response to reciprocation of piston 12 in the cylinder 14, and/or signals originating from the sensors and control system. In the illustrated embodiment, the magnetically-geared valve actuation system 20 includes the magnetically-geared actuator 22 coupled to the intake valves 16, 17 and configured to open and close the intake valves 16, 17. The first magnetically-geared actuator 22 includes the rotor 26 disposed between the first stator 28 and the second stator 30. The rotor 26 is coupled to the intake valves 16, 17 via a valve bridge (connector) 19. The stators 28, 30 are coupled to a cylinder head. In the illustrated embodiment, the magnetically-geared valve actuation system 20 is used to actuate only a plurality of air intake valves of the engine. In another exemplary embodiment, the magnetically-geared valve actuation system 20 is used to actuate only a plurality of exhaust valves of the engine.

Figure 4:
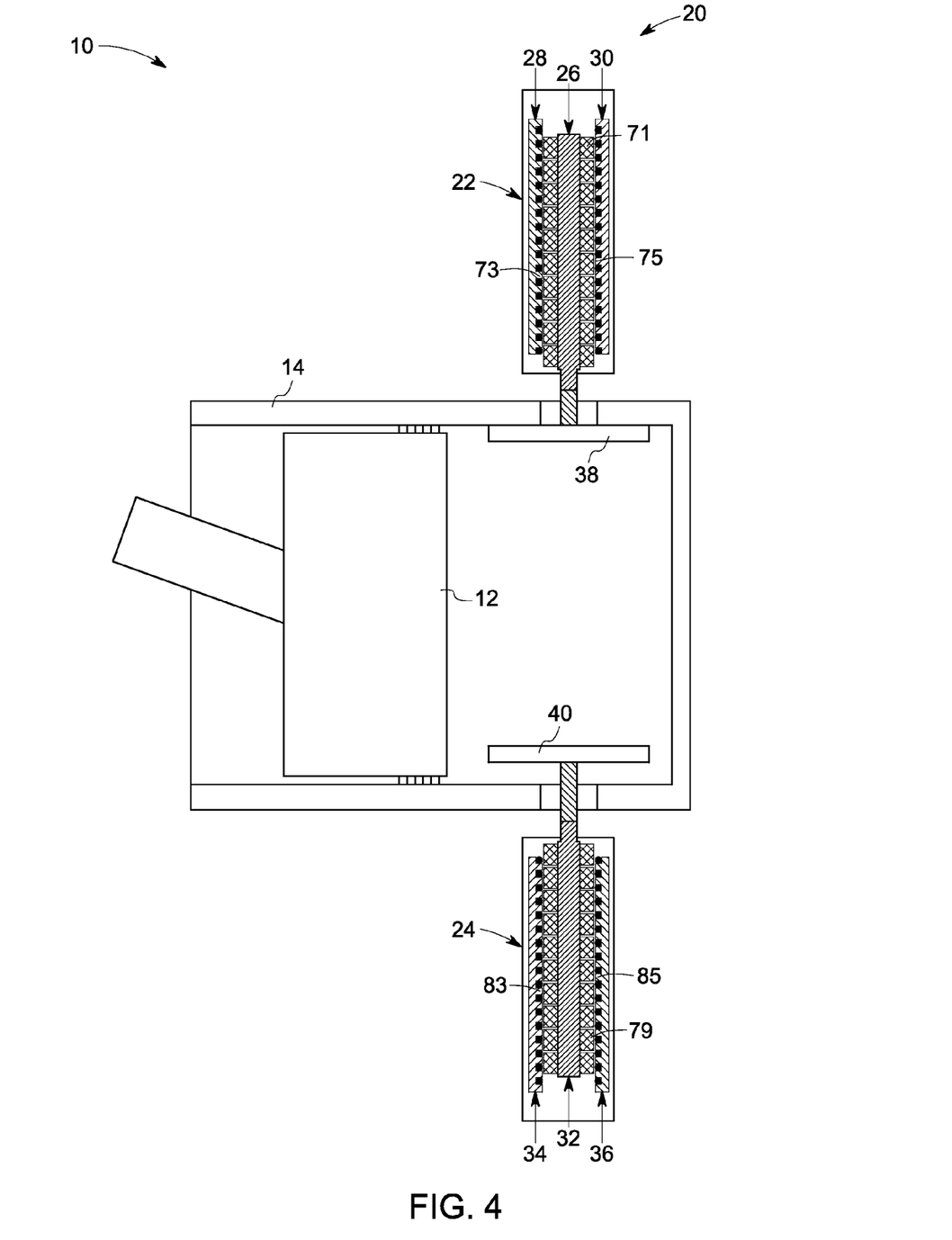
FIG. 4 is a diagrammatical view of a magnetic gearing system configured to actuate a suction valve and discharge valve of a piston compressor in accordance with another exemplary embodiment of the present invention.

Referring to FIG. 4, a machine 10 in accordance with an exemplary embodiment of the present invention is disclosed. In the illustrated embodiment, the machine 10 is a piston compressor having a radial valve arrangement. The compressor 10 includes a piston 12 slidably disposed in a housing 14 and reciprocates between a top dead center and a bottom dead center position. The illustrated compressor 10 includes a plate shaped suction valve 38 and a discharge valve 40 coupled to the housing 14. Air is supplied to the housing 14 through the suction valve 38 for compression within the housing 14. The compressed air is discharged from the housing 14 via the discharge valve 40. In another embodiment, the suction valve 38 and the discharge valve 40 may be ring-shaped. In certain embodiments, due to the active, individual control of each compressor valve, the valves may be mushroom-shaped like in engines to further reduce valve losses, thereby increasing compressor efficiency.

When the compressor is driven and is in an operation state, the piston 12 reciprocates in the housing 14. When the piston 12 is advanced to carry out a discharge stroke, a gaseous fluid is compressed in the housing 14. During the discharge stroke, the suction valve 38 is closed due an increase in gas pressure in the housing 14 to close a suction port. Simultaneously, the discharge valve 40 opens a discharge port due to the gas pressure. When the piston 12 is advanced to carry out a suction stroke, the discharge valve 40 is closed by gas pressure in the housing. In this event, the gas pressure lowers in the housing. Therefore, the suction valve 38 opens the suction port due to negative pressure in the housing.

Flexible control of suction and discharge valves through variable valve timing enables reduction in valve losses and thus increases machine efficiency. In the illustrated embodiment, the engine 10 includes a magnetically-geared valve actuation system 20 configured to actuate the suction valve 38 and the discharge valve 40. The magnetically-geared valve actuation system 20 includes the first magnetically-geared actuator 22 connected to the suction valve 38. Rotor 26 of the actuator 22 includes a set of plurality of permanent magnets 71 disposed thereon. Each of the stators 28 and 30 include plurality of stator teeth 73 and 75 respectively. The magnetically-geared valve actuation system 20 also includes the second magnetically-geared actuator 24 connected to the discharge valve 40. The actuator 24 includes the rotor 32 having a plurality of permanent magnets 79 disposed thereon. The stators 34 and 36 include plurality of stator teeth 83 and 85 respectively. It may be observed that size of permanent magnets 71, 79 is different from the size of stator teeth 73, 75, 83, 85. In an embodiment, the permanent magnets 71, 79 are substantially larger than stator teeth 73, 75, 83, 85.

Figure 5:
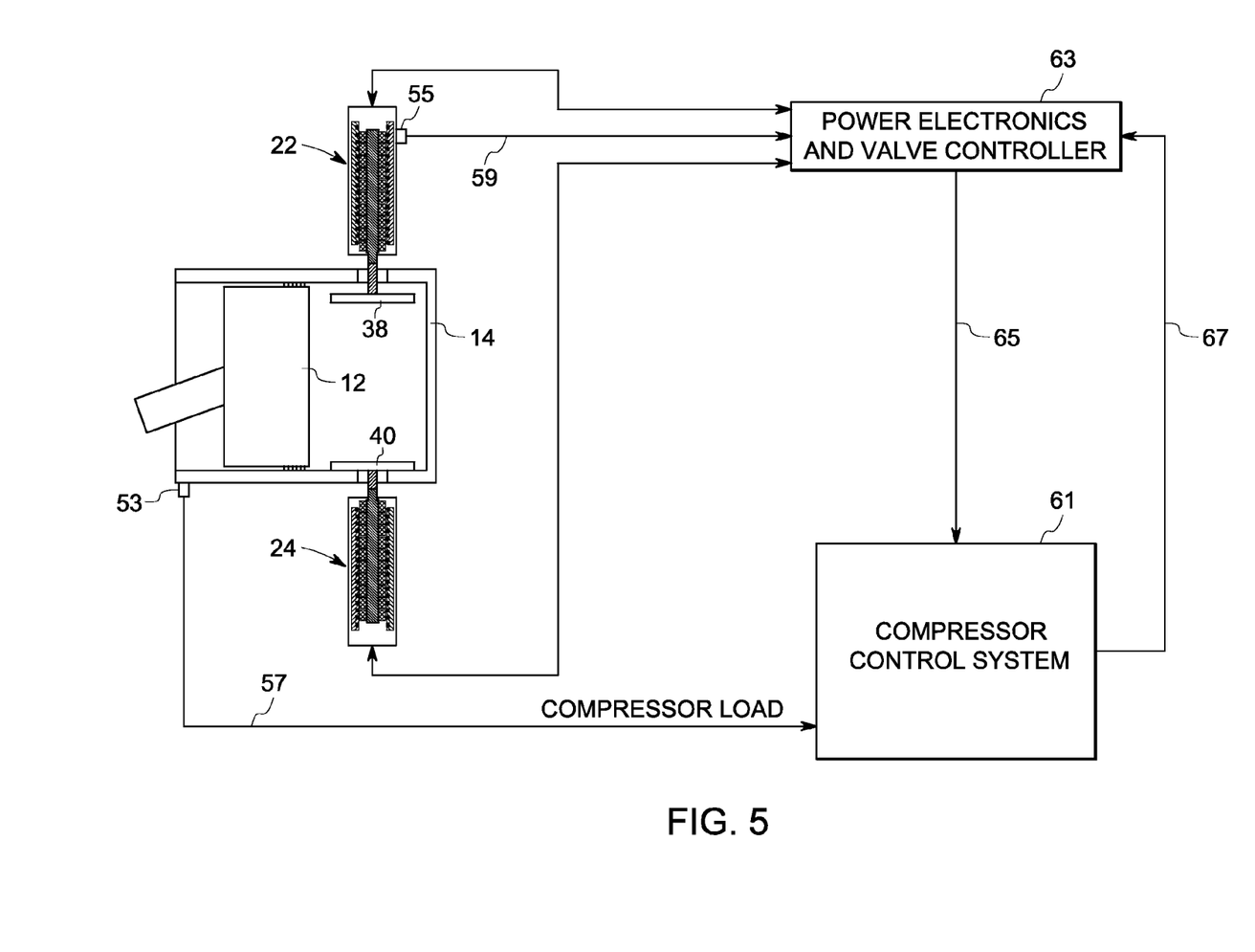
FIG. 5 is a diagrammatical view of a magnetic gearing system configured to actuate a suction valve and discharge valve of a piston compressor in accordance with the aspects of FIG. 4.

Referring now to FIG. 5, in the illustrated embodiment, a plurality of sensors such as a load sensor 53, valve position sensor 55, or the like are provided to detect a plurality of parameters of the engine 10. The load sensor 53 is configured to detect compressor load. The valve position sensor 55 is configured to detect position of valves. In certain embodiments, sensors may be provided to detect parameters including valve damage, deposits, cylinder pressure, inlet flow rate, and discharge flow rate. In certain other embodiments, it should be noted herein the list of sensors and parameters may include other suitable sensors and parameters not mentioned above.

In the illustrated embodiment, output signal 57 from the load sensor 53 is transmitted to a compressor control system 61. A power electronics and valve controller 63 may be used to detect and transmit output signals 65 indicative of valve damage, deposits, cylinder pressure, inlet and discharge flow rate to the compressor control system 61. The engine control system 33 transmits an out put signal 67 indicative of valve position, piston stroke, cylinder switch off, or the like to the power electronics and valve controller 63. In the illustrated embodiment, the valve position sensor 55 transmits an output signal 59 to the controller 63. The compressor control system 61 is configured to actuate the magnetically-geared valve actuation system 20 via the controller 63 in response to reciprocation of piston 12 in the housing 14, signals originating from the sensors mentioned above or the control system, or combinations thereof. It should be noted herein that the illustrated architecture is an exemplary embodiment and should not be construed as limiting. Any combination of engine parameters may be used to control the actuation of the valves 38, 40.

Referring to FIGS. 4 and 5, in the illustrated embodiment, the magnetically-geared valve actuation system 20 includes a first magnetically-geared actuator 22 coupled to the suction valve 38 and configured to open and close the suction valve 38. The first magnetically-geared actuator 22 includes the rotor 26 disposed between the first stator 28 and the second stator 30. The rotor 26 is coupled to the suction valve 38 and the stators 28, 30 are coupled to a cylinder head. The magnetically-geared valve actuation system 20 also includes the second magnetically-geared actuator 24 coupled to the discharge valve 40. The second magnetically-geared actuator 24 includes a rotor 32 disposed between the third stator 34 and the fourth stator 36. The rotor 32 is coupled to the discharge valve 40 and the stators 34, 36 are coupled to the cylinder head. The working of the magnetically-geared valve actuation system and various configurations are discussed in greater details with reference to subsequent figures. It should be noted herein that the exemplary valve actuation system is applicable to compressors having more than one suction and discharge valves.

Figure 6:
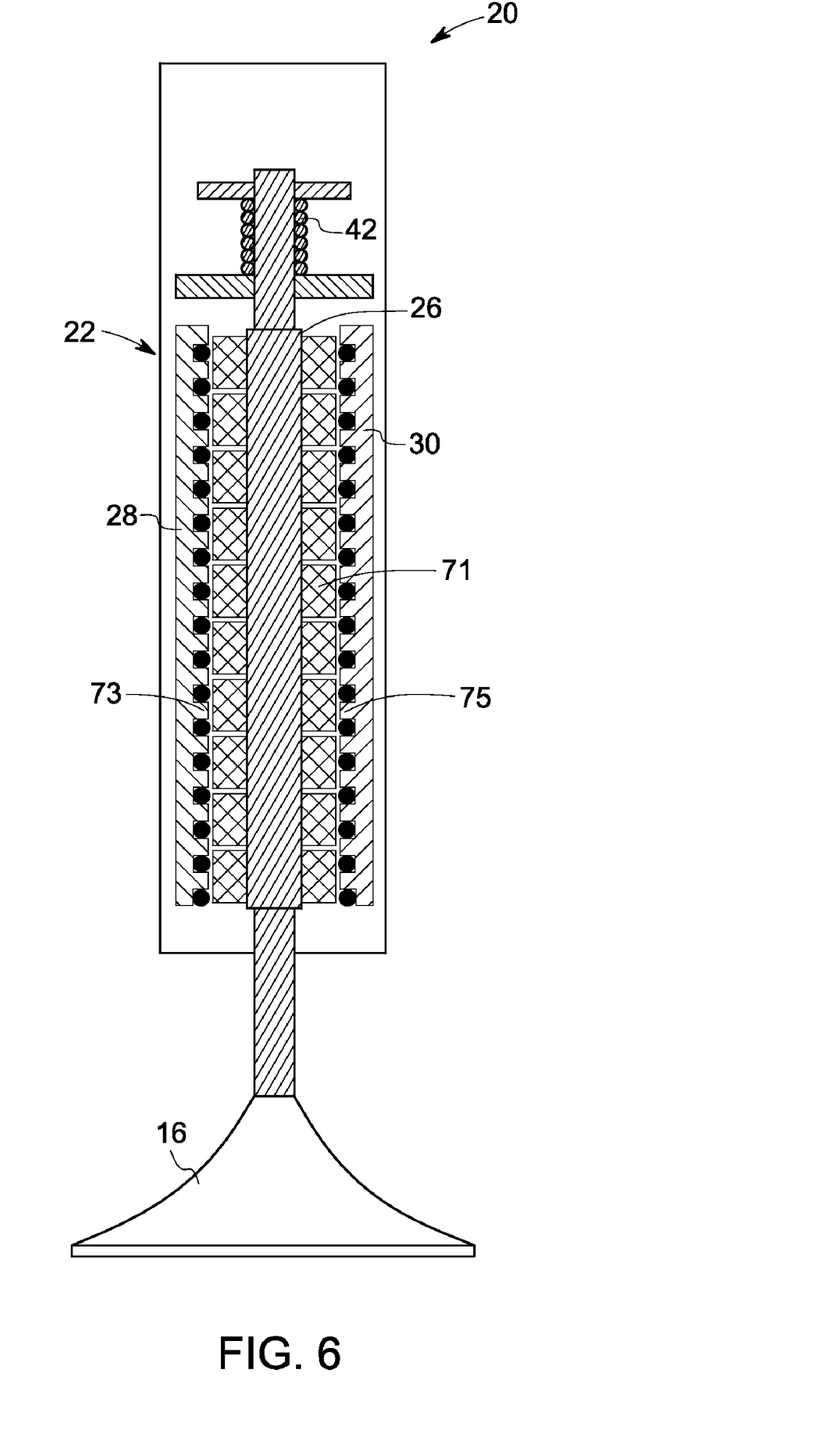
FIG. 6 is a diagrammatical view of a magnetic gearing actuator having a biasing device to ensure fail safe operation in accordance with another exemplary embodiment of the present invention.

Referring to FIG. 6, a magnetically-geared actuator 20 in accordance with aspects of FIG. 1 is illustrated. In FIG. 6, the magnetically-geared actuator 20 is coupled to the air intake valve 16 and configured to open and close the air intake valve 16 in response to reciprocation of the piston in the cylinder, signals originating from the sensors mentioned above or the control system, or combinations thereof. As discussed previously, the first magnetically-geared actuator 22 includes the rotor 26 disposed between the first stator 28 and the second stator 30. The rotor 26 is coupled to the intake valve 16 and the stators 28, 30 are coupled to a cylinder head.

In the illustrated embodiment, the magnetically-geared actuator 20 includes a biasing device 42 configured to actuate the magnetically-geared actuator 20 and bias the valve 16 to a predetermined position (may be opened or closed position) when a power supply to the magnetic gearing actuator 20 is interrupted or turned off. In one embodiment, this ensures that the valve is not in an open position when power supply to the actuator 20 is cut-off. In the illustrated embodiment, the biasing device 42 includes a biasing spring. In other embodiments, other suitable biasing devices are also envisaged.

Figure 7:
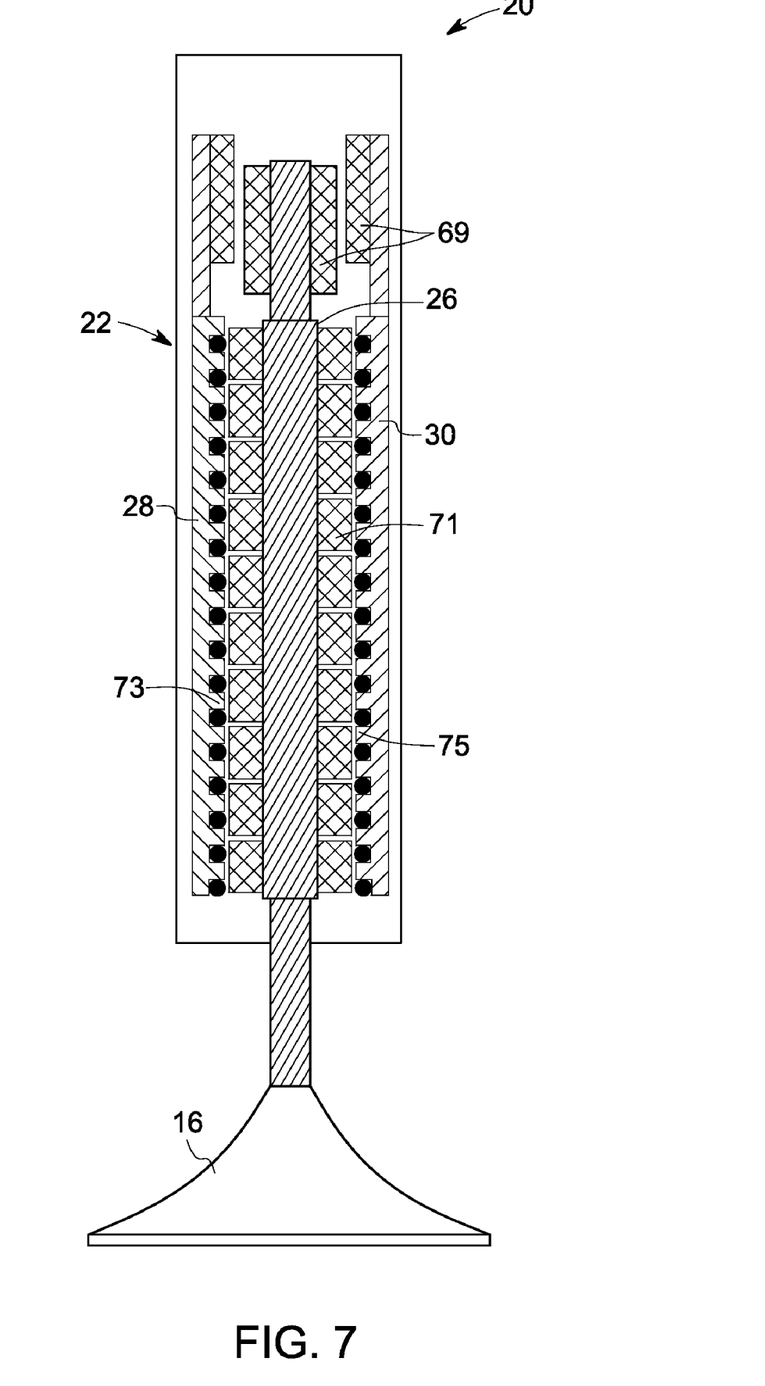
FIG. 7 is a diagrammatical view of a magnetic gearing actuator having a biasing device to ensure fail safe operation in accordance with another exemplary embodiment of the present invention.

Referring to FIG. 7, a magnetically-geared actuator 20 in accordance with aspects of FIG. 1 is illustrated. In the illustrated embodiment, the magnetically-geared actuator 20 includes a biasing device 69 configured to actuate the magnetically-geared actuator 20 and bias the valve 16 to a predetermined position (may be opened or closed position) when a power supply to the magnetically-geared actuator 20 is interrupted or turned off. In the illustrated embodiment, the biasing device 42 includes a plurality of permanent magnets. With reference to embodiments illustrated in FIGS. 1-5, the configurations of the magnetically-geared actuators may vary depending upon the application.

Figure 8:
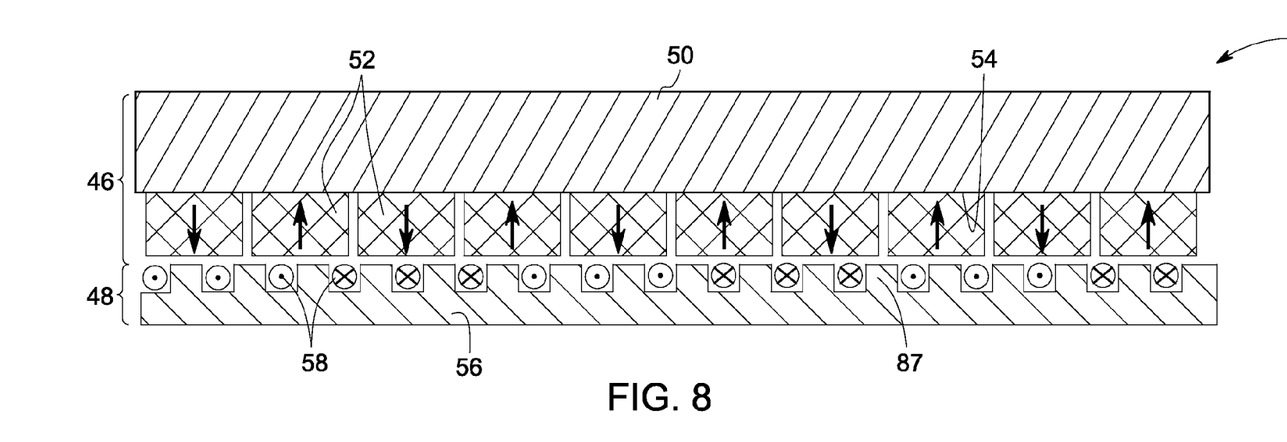
FIG. 8 is a diagrammatical view of a magnetic gearing actuator having a rotor and a stator disposed to one side of the rotor in accordance with another exemplary embodiment of the present invention.

Referring to FIG. 8, a magnetically-geared actuator 44 in accordance with another exemplary embodiment of the present invention is disclosed. In the illustrated embodiment, the actuator 44 includes a moveable rotor 46 and a stator 48. In the embodiment depicted, the rotor 46 is outwardly disposed with respect to the stator 48. The rotor 46 has a rotor core 50 and a plurality of permanent magnets 52 of alternating orientation formed on an inner surface 54 of the rotor core 50. The stator 48 includes a stator core 56, a plurality of stator teeth 87 and a plurality of stator windings 58 coupled to the stator core 56. It may be noted that the size of the plurality of permanent magnets 52 is different from the size of the plurality of stator teeth 87. The size of the plurality of permanent magnets 52 is substantially larger than the size of the plurality of stator teeth 87. The number of permanent magnets 52 provided on the rotor core 50 and the number of stator windings 58 provided on the stator core 56 may vary depending upon the application. Advantageously, the torque density provided by the exemplary configuration allows for a significant reduction in machine size, resulting in a cost and mass savings. As indicated above, an outer rotor/inner stator is one possible configuration for the piston machine apparatus with integrated magnetic gearing. In another exemplary embodiment, the actuator 44 includes an inner permanent magnet rotor and an outer stator. In such an embodiment, the plurality of permanent magnets 52 is provided on an outer surface of the rotor core 50. It should be noted herein that the term "rotor" in the above and subsequent embodiments may refer to either a "reciprocating component" or a "rotary component".

Figure 9:
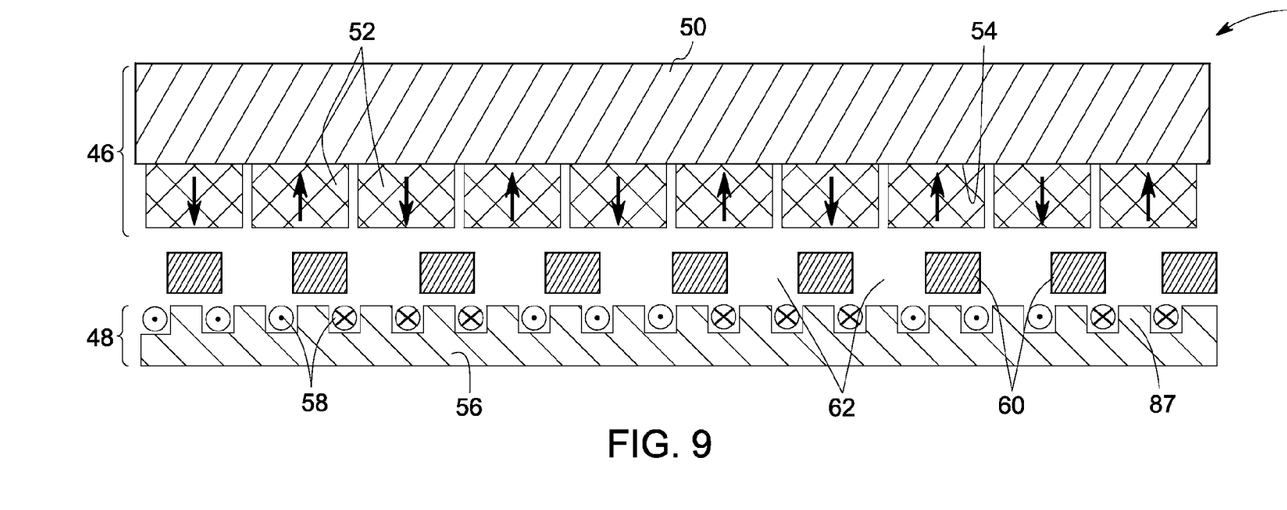
FIG. 9 is a diagrammatical view of a magnetic gearing actuator having a rotor, a stator, and a plurality of stationary pole-pieces disposed between the stator and the rotor in accordance with another exemplary embodiment of the present invention.

Referring to FIG. 9, a magnetically-geared actuator 44 in accordance with another exemplary embodiment of the present invention is disclosed. In the illustrated embodiment, the rotor 46 has a rotor core 50 and a plurality of permanent magnets 52 of alternating orientation formed on an inner surface 54 of the rotor core 50. The stator 48 includes a stator core 56, a plurality of stator teeth 87 and a plurality of stator windings 58 coupled to the stator core 56. Similar to the previous embodiment of FIG. 8, it may be noted that the size of the plurality of permanent magnets 52 is different from the size of the plurality of stator teeth 87. A plurality of stationary magnetic pole-pieces 60 is disposed within the air gap 62 formed between the rotor magnets 52 and the stator windings 58. Depending upon the machine requirements, the pole-pieces 60 may be mounted to the stator core 56 (e.g., by stamping from the same lamination sheet as the stator core material) or may be separately mounted. In one embodiment, an air gap may be present between the stator core 56 and the pole-pieces 60. In another embodiment, a non-magnetic material may be inserted between the stator core 56 and the pole-pieces 60. The stationary pole-pieces 60 facilitate torque transmission between the magnetic field excited by the permanent magnet rotor 46 and the magnetic field excited by the stationary windings 58. The number of permanent magnets 52, stator windings 58 and the pole-pieces 60 may be varied depending upon the application.

Figure 10:
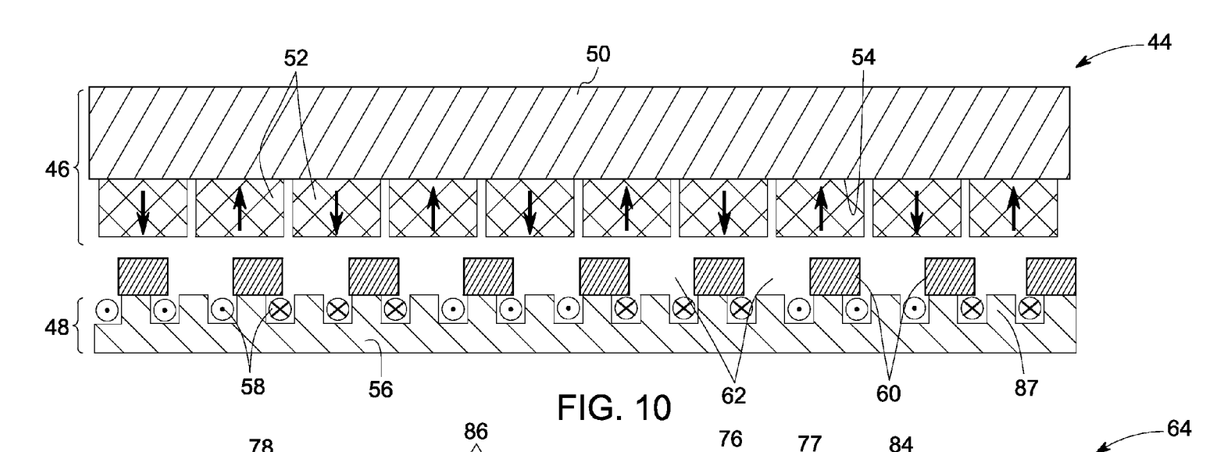
FIG. 10 is a diagrammatical view of a magnetic gearing actuator having a rotor, a stator disposed to one side of the rotor, and a plurality of stationary pole-pieces integrated to the stator in accordance with another exemplary embodiment of the present invention.

Referring to FIG. 10, a magnetically-geared actuator 44 in accordance with another exemplary embodiment of the present invention is disclosed. In the illustrated embodiment, the rotor 46 has a rotor core 50 and a plurality of permanent magnets 52 of alternating orientation formed on an inner surface 54 of the rotor core 50. The stator 48 includes a stator core 56, a plurality of stator teeth 87 and a plurality of stator windings 58 coupled to the stator core 56. Similar to the previous embodiments of FIGS. 8 and 9, it may be noted that the size of the plurality of permanent magnets 52 is different from the size of the plurality of stator teeth 87. In an embodiment, the plurality of permanent magnets 52 may be substantially larger than the plurality of stator teeth 87. A plurality of stationary magnetic pole-pieces 60 is disposed within the air gap 62 formed between the rotor magnets 52 and the stator windings 58. In the illustrated embodiment, the pole-pieces 60 are integrated to the stator core 56. As discussed in the previous embodiment, the stationary pole-pieces 60 facilitate torque transmission between the magnetic field excited by the permanent magnet rotor 46 and the magnetic field excited by the stationary windings 58.

Figure 11:
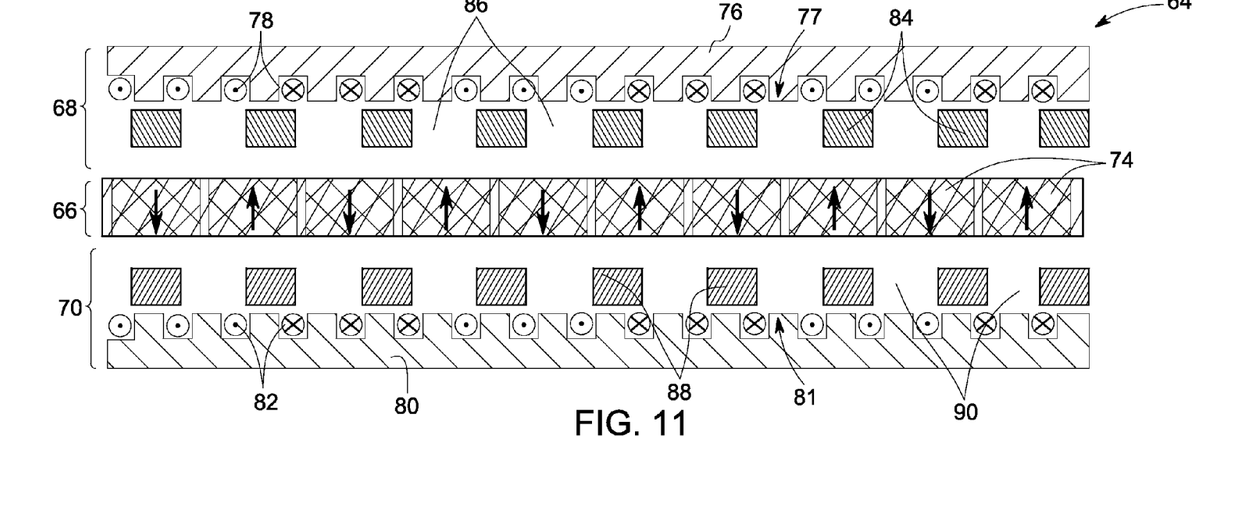
FIG. 11 is a diagrammatical view of magnetic gearing actuator having a rotor and two stators disposed respectively to either sides of the rotor in accordance with another exemplary embodiment of the present invention.

Referring to FIG. 11, a magnetically-geared actuator 64 in accordance with another exemplary embodiment of the present invention is disclosed. In the illustrated embodiment, the actuator 64 includes a moveable rotor 66 disposed between a first stator (outer stator) 68 and a second stator (inner stator) 70. The rotor 66 has a rotor core 72 and a plurality of permanent magnets 74 integrated with the rotor core 72. The first stator 68 includes a first stator core 76, a first set of plurality of stator teeth 77 and a plurality of stator windings 78 coupled to the first stator core 76. The second stator 70 includes a second stator core 80, a second set of plurality of stator teeth 81 and a plurality of stator windings 82 coupled to the second stator core 80. It may be noted that the size of the first and second set of plurality of stator teeth 77 and 81 is different from the size of plurality of permanent magnets 74. The size of the plurality of permanent magnets 74 is substantially larger than the size of the plurality of stator teeth 77, 81. In the illustrated embodiment, a first set of stationary magnetic pole-pieces 84 is disposed within an air gap 86 formed between the rotor magnets 74 and the stator windings 78. A second set of stationary magnetic pole-pieces 88 is disposed with an air gap 90 formed between the rotor magnets 74 and the windings 82. Similar to the embodiment illustrated in FIG. 10, the first set of stationary magnetic pole-pieces 84 may be integrated to the first stator core 76. The second set of stationary magnetic pole-pieces 88 may be integrated to the second stator core 80.

Figure 12:
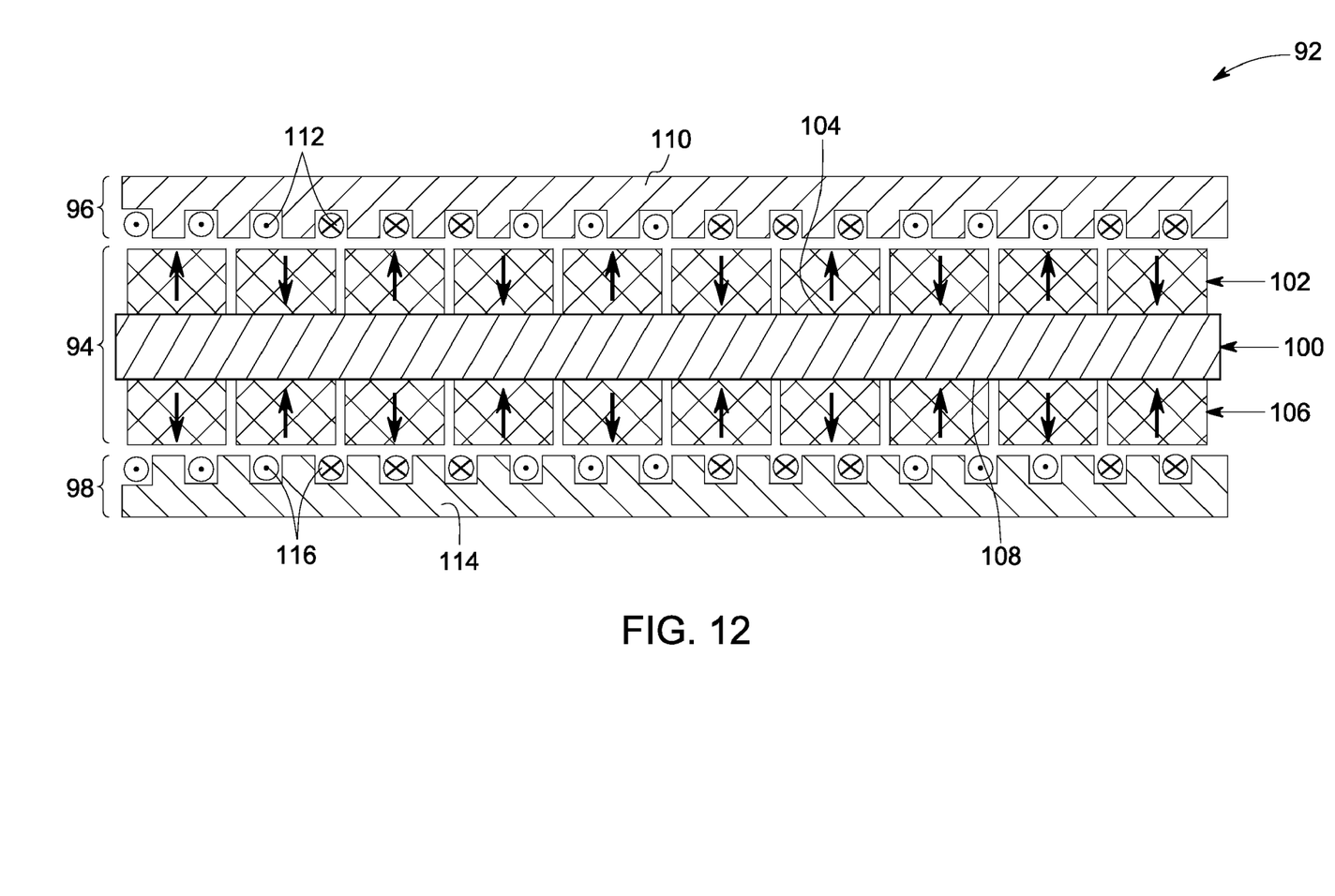
FIG. 12 is a diagrammatical view of a magnetic gearing actuator having a rotor including a rotor core and two sets of permanent magnets disposed respectively to either sides of the rotor core in accordance with an exemplary embodiment of the present invention.

Referring to FIG. 12, a magnetically-geared actuator 92 in accordance with another exemplary embodiment of the present invention is disclosed. In the illustrated embodiment, the actuator 92 includes a moveable rotor 94 disposed between a first stator (outer stator) 96 and a second stator (inner stator) 98. The rotor 94 has a rotor core 100, a first set of permanent magnets 102 provided on a first surface (outer surface) 104 of the rotor core 100, and a second set of permanent magnets 106 provided on a second surface (inner surface) 108 of the rotor core 100. The first stator 96 includes a first stator core 110, a first set of plurality of stator teeth 111 and a plurality of stator windings 112 coupled to the first stator core 110. The second stator 98 includes a second stator core 114, a second set of plurality of stator teeth 115 and a plurality of stator windings 116 coupled to the second stator core 114. It may be noted that the size of the first and second set of plurality of stator teeth 111, 115 is different from the size of first and second set of plurality of permanent magnets 102, 106. The size of the plurality of permanent magnets 102, 106 is substantially larger than the size of the plurality of stator teeth 111, 115. Similar to the embodiment illustrated in FIGS. 9 and 10, stationary magnetic pole-pieces (not shown in FIG. 12) may be disposed between the rotor magnets and the stator windings or integrated into the stator cores.

In the various embodiments depicted above, the rotors of the piston machines are implemented with permanent magnet rotors. However, it is also contemplated that the integrated magnetic gearing may also be accomplished through the use of rotors having wound field, squirrel cage, or switched reluctance poles. In other words, the rotor's magnetic field may be implemented through DC powered electromagnets, in lieu of permanent magnets. Furthermore, with regard to the stationary pole-pieces that serve as flux modulation devices, the shape of such pieces may be embodied by other insert shapes in addition to square inserts, such as oval or trapezoidal shapes for example. The configurations illustrated in the above embodiments are shown as including three-phase windings for purposes of example. It should also be understood that a different number of phases might be used as well.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A machine, comprising:
a housing;
a piston disposed in the housing and configured to reciprocate in the housing;
at least one valve coupled to the housing;
a magnetically-geared valve actuation system coupled to the at least one valve; wherein the magnetically-geared valve actuation system comprises a rotor having a rotor core and a plurality of permanent magnets disposed thereon, at least one stator including a stator core having a plurality of stator teeth; wherein size of the plurality of stator teeth are substantially different from size of the plurality of permanent magnets;
a plurality of sensors configured to detect a plurality of parameters related to the machine; and
a control system coupled to the plurality of sensors and the magnetically-geared valve actuation system; wherein the magnetically-geared valve actuation system is configured to actuate the at least one valve in response to reciprocation of the piston in the housing, signals originating from the sensors or control system, or combinations thereof.

2. The machine of claim 1 wherein the magnetically-geared valve actuation system comprises a stator and a rotor, wherein the rotor comprises a rotor core and a plurality of permanent magnets of alternating orientation situated on the rotor core.

3. The machine of claim 2 further comprising a plurality of stationary magnetic pole-pieces.

4. The machine of claim 3 wherein the stator comprises a stator core and a plurality of stator windings coupled to the stator core, and wherein the plurality of stationary magnetic pole-pieces are disposed between the plurality of permanent magnets and the plurality of stator windings.

5. The machine of claim 4 wherein the stator comprises a stator core and a plurality of stator windings coupled to the stator core, and wherein the plurality of stationary magnetic pole-pieces are integrated to the stator core.

6. The machine of claim 1 wherein the at least one stator comprises a first stator core and a second stator core and wherein the rotor is disposed between the first stator core and the second stator core.

7. The machine of claim 6 wherein the rotor comprises a rotor core and a plurality of permanent magnets of alternate orientation integrated to the rotor core.

8. The machine of claim 7 further comprising a first set of stationary pole-pieces disposed between the rotor and the first stator and a second set of stationary pole-pieces disposed between the rotor and the second stator.

9. The machine of claim 8 wherein the first stator comprises a first stator core, and the second stator comprises a second stator core; wherein the first set of stationary pole-pieces are integrated to the first stator core, wherein the second set of stationary pole-pieces are integrated to the second stator core.

10. The machine of claim 6 wherein the rotor comprises a rotor core having a first surface and a second surface, a first set of permanent magnets situated on the first surface of the rotor core, and a second set of permanent magnets situated on the second surface of the rotor core.

11. The machine of claim 1 wherein the magnetically-geared valve actuation system comprises a magnetically-geared actuator and a biasing device configured to actuate the magnetically-geared actuator and bias the at least one valve to a predetermined position when power supply to the magnetically-geared actuator is interrupted or turned off.

12. The machine of claim 11 wherein the biasing device comprises a spring.

13. The machine of claim 11 wherein the biasing device comprises one or more permanent magnets.

14. The machine of claim 1 wherein the plurality of permanent magnets are substantially larger than the plurality of stator teeth.

15. The machine of claim 1 wherein the plurality of permanent magnets are disposed on both sides of the rotor.

16. A compressor comprising:
a housing;
a piston disposed in the housing and configured to reciprocate in the housing;
at least one suction valve coupled to the housing;
at least one discharge valve coupled to the housing;
a magnetically-geared valve actuation system coupled to the at least one suction valve, the at least one discharge valve, or combinations thereof; wherein the magnetically-geared valve actuation system comprises a rotor having a rotor core and a plurality of permanent magnets disposed thereon, at least one stator including a stator core having a plurality of stator teeth; wherein size of the plurality of stator teeth are substantially different from size of the plurality of permanent magnets;
a plurality of sensors configured to detect a plurality of parameters related to the compressor; and
a control system coupled to the plurality of sensors and the magnetically-geared valve actuation system, wherein the magnetically-geared valve actuation system is configured to actuate the at least one suction valve, the at least one discharge valve, or combinations thereof in response to reciprocation of the piston in the housing, signals originating from the sensors or control system, or combinations thereof.

17. The compressor of claim 16 wherein the magnetically-geared valve actuation system comprises one or more first magnetically-geared actuators coupled to one or more suction valves and one or more second magnetically-geared actuators coupled to one or more discharge valves.

18. The compressor of claim 16 wherein the magnetically-geared valve actuation system comprises a magnetically-geared actuator and a biasing device configured to actuate the magnetically-geared actuator and bias the at least one suction valve, the at least one discharge valve, or combinations thereof to a predetermined position when a power supply to the magnetically-geared actuator is interrupted or turned off.

19. The compressor of claim 18 wherein the biasing device comprises a spring.

20. The compressor of claim 18 wherein the biasing device comprises at least one permanent magnet.

21. The compressor of claim 16 wherein the plurality of permanent magnets are substantially larger than the plurality of stator teeth.

22. The compressor of claim 16 wherein the plurality of permanent magnets are disposed on both sides of the rotor.

* * * * *